May 24, 1960

A. N. SZWARGULSKI 2,937,755

FILTER FOR ELECTRIC FUEL PUMP

Filed Sept. 13, 1954

*INVENTOR.*
ALEX N. SZWARGULSKI
BY
*George R. Ericson*

ATTORNEY

INVENTOR.
ALEX N. SZWARGULSKI
BY
*George R. Ericson*

ATTORNEY

May 24, 1960     A. N. SZWARGULSKI     2,937,755
FILTER FOR ELECTRIC FUEL PUMP

Filed Sept. 13, 1954                       3 Sheets-Sheet 3

*INVENTOR.*
ALEX N. SZWARGULSKI
BY
*George R. Ericson*
ATTORNEY

United States Patent Office 2,937,755
Patented May 24, 1960

2,937,755

FILTER FOR ELECTRIC FUEL PUMP

Alex N. Szwargulski, St. Louis, Mo., assignor, by mesne assignments, to ACF Industries, Incorporated, New York, N.Y., a corporation of New Jersey Filed Sept. 13, 1954, Ser. No. 455,405

8 Claims. (Cl. 210—172)

This invention relates to fuel systems and, more particularly, to filters and their application to a fuel system in a novel manner to separate fluids and at the same time permit the escape of vapors and gases so as to minimize the chance of vapor lock in the fuel pump or fuel lines.

The presence of water in the fuel system of a motor vehicle can be a source of serious trouble, and, since this condition will exist, it is a present practice to use traps and filters at the fuel pump inlets and outlets to separate the water from the fuel.

Several filter materials are known in the art which will perform this separating action between the liquids. All of these materials, however, have a certain definite resistance to the passage of vapors and gases, which often form adjacent the fuel inlet of a pump, as is well understood by those skilled in the art.

As an example, one of the filtering materials above referred to is a woven fabric (about 90 x 46) composed of extruded filaments of polyvinylidene chloride "Saran" of about .01 inch. This fabric is milled under heat and pressure to give a porosity as fine as .003 to .0035 inch. When dry, a three-inch diameter, double layer of this material requires four to eight inches of water pressure to produce a flow of ten cubic feet of air per minute. If the pores of this material are filled with fluid, as when wet, the resistance to air or gas flow increases. To this resistance is added a resistance equal to the pressure head of the depth of fuel in the tank. Tests duplicating ordinary operating conditions at various fuel temperatures and levels have indicated that positive gas pressures are developed within the filter measuring several inches of water pressure. No other than the reason above explained is believed to be responsible for this condition. Any gas pressure at the inlet of the pump cannot help but impede the flow of fuel through the filter, and, obviously, lack of an adequate fuel supply at the pump inlet leads ultimately to vapor lock.

The present invention is aimed at overcoming these disadvantages.

In the novel devices herein disclosed, the filtering element is arranged with respect to the pump inlet so that there is always an unimpeded passage left for the escape of trapped vapors from the filter.

In one form of the invention, the water-repellant filter element is open and extended to a point above the surface of the liquid in the fuel tank, so that a venting passage is left, or so that some part of the filter material will remain dry.

In the other forms of the invention, the water-repellant material of the filter element is extended to a point in the fuel tank above any probable water level, and a vent is provided.

The accompanying drawings illustrate several devices constructed in accordance with the present invention.

Figure 1:
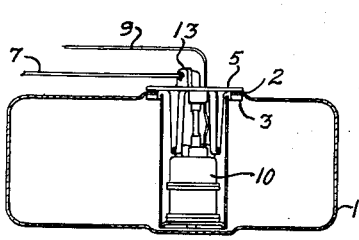
Fig. 1 is an environmental view showing the pump and an embodiment of the filter installed in a fuel tank.

The specific applications illustrated in the drawing and described hereinafter are illustrative of the invention as applied to submerged, electric driven fuel pumps.

Figure 2:
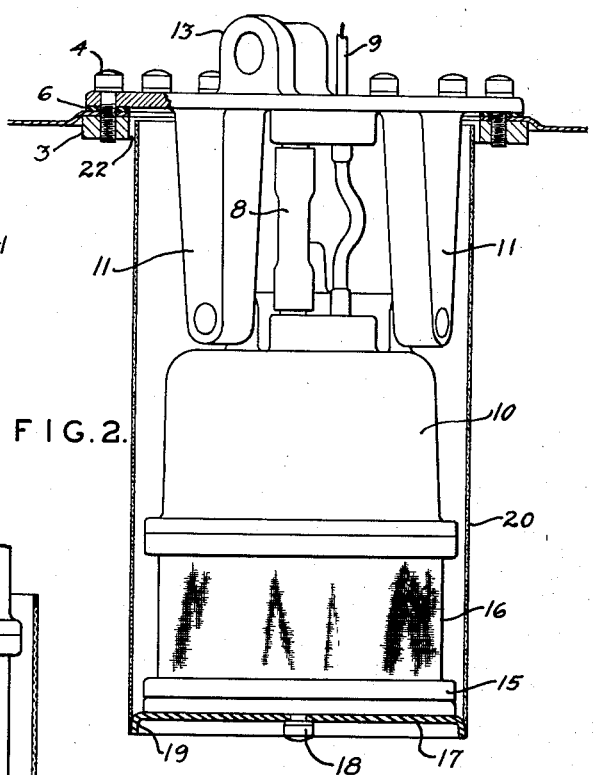
Fig. 2 is an enlarged view, partly in section, of the installation in Fig. 1.

In Fig. 1 a motor vehicle fuel tank 1 is shown in section. At the top of the tank is an access opening 2 provided with a reinforcing ring 3 welded or otherwise secured to the inner surface of the tank at the margin of the access hole. A plurality of tapped holes in the reinforcing ring 3 receive a plurality of cap screws 4 firmly securing the access cover plate 5. The joint between this plate and the tank is sealed by a gasket 6 as shown in Fig. 2.

Integral with the access cover plate 5 is a fitting 13 providing a connection for the fuel supply line 7. Fuel is supplied to the line 7 by way of a flexible connection 8. An insulated electric conductor 9 extends from the battery of the motor vehicle through the cover plate 5 to the pump body 10, which is flexibly supported by the hangers 11. The features of the pump and its support are the same as those shown in a copending application of Alfred D. Korte, et al., S.N. 431,743, filed May 24, 1954, for Electric Fuel Pump now Patent No. 2,803,384.

Spaced from the motor casing of the pump body 10 is the pump casing 15, and between the two is formed a peripheral opening containing a screen 16 for the purpose of preventing the entrance of foreign material into the intake side of the pump.

A plastic disk 17 is secured to the bottom of the pump casing by a screw 18, or the like. The outer peripheral edges of the disk 17 are flanged at 19. To this flange is secured by heat or solvent, or the like, the tubular filter element 20. In this case the tubular element 20 is composed of a double layer of woven "Saran" and extends upwardly, completely surrounding the pump body in spaced relation thereto. The upper end of the tubular filter element is disposed between the access cover plate 5 and the reinforcing ring 3. In this arrangement, the filter element is spaced from the reinforcing ring 3 and the access cover plate 5 so as to leave a passage from the inside of the filter element to the tank.

In the embodiment above described, the area of the filter element 20 exposed to the fluid is larger in diameter and area than the screen element 16. The filter action is thereby improved, as well as the supply to the intake of the pump. It is contemplated that in the action of the device tht filter element 20 will fill with gasoline substantially to the level of the fuel in the tank 1 under static conditions. However, when the pump begins to operate, the fuel level within the filter element 20 will be lowered, decreasing the static head on the intake of the pump, and likewise the static head imposed upon the vapors escaping through the screen element 16. This will facilitate the venting of the vapors upwardly within the filter element 20 and out of the passage 22 into the top of the tank.

In this arrangement, the vapors do not have to escape through the filter element 20, and, consequently, the pressure head of liquid and the resistance of the filter itself are removed from the path of escape of the vapors. Positive pressures of vapor at the intake of the pump are eliminated, and no pocket of trapped vapors will be confined within the filter element 20 to impede the flow of fuel through the filter element. In this modification, the filter element extends far above any probable level which would be attained by an accumulation of water within the fuel tank 1.

Figure 3:
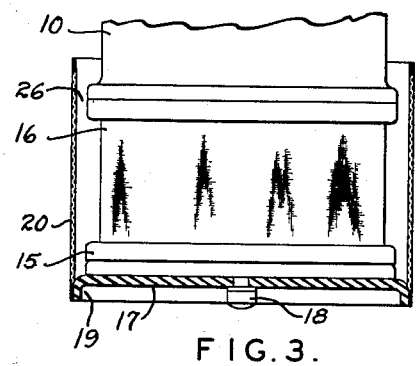
Fig. 3 is a fragmentary view, partly in section, of a pump with a modified form of filter.
Figure 4:
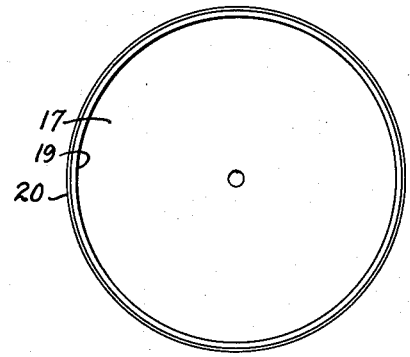
Fig. 4 is a plan view of the closed end of the filter shown in Figs. 1 to 3.

In Fig. 3 is shown a modification of the invention disclosed in Fig. 1. In this figure, like reference characters have been used to indicate the same parts. The filtering element 20 disclosed here extends to a point spaced from the pump body 10 above the inlet screen 16. The filter 20 extends far enough to be well beyond any probable level attained by an accumulation of water within the tank 1.

In operation, the result achieved by the device of Fig. 3 will be similar to that described for Fig. 1. Under static conditions, the fuel in the tank will fill the filter 20 either over the top edge thereof or through the filter. This is immaterial, since the filter 20 has the function of preventing the entrance of water, but not of fuel. During operation, the pump will lower the level of fuel in the tank, but not within the filter 20 until the level in the tank drops below the upper edge of the filter. The spaced relation between the filter element 20 and the body of the pump indicated here as 26 will provide for the escape of vapors upwardly within the filter element, rather than compelling the passage of the fuel vapors through the element 20, which is to be avoided. The sole resistance to the escape of the vapors from the pump intake will be the static fuel head due to the level of the fuel in the tank 1. When that level drops below the upper edge of the filter element, the chances are that the static pressure will be removed. But in any case, no water can enter the pump.

Figure 5:
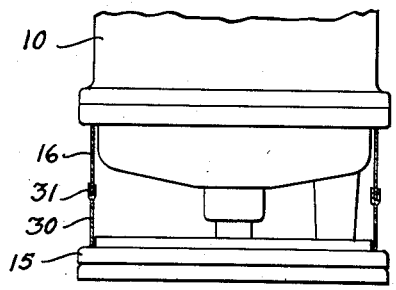
Fig. 5 is a fragmentary view in elevation, and partly in section, of a third form of the invention.

Fig. 5 shows another modification of the invention in which the filtering element is combined with the inlet screen 16. In this form of the invention, the tubular filter element 30 is sealed at its bottom edge to the pump casing 15, and extends upwardly beyond any probable liquid level attained by water accumulating in the tank. A suitable joint 31 unites the screen 16 and the filter element 30.

The structure shown in Fig. 5 will prevent the entrance of water into the intake of the pump because the "Saran" filter 30 has a water-tight seal at its lower edge with the pump casing 15 and extends upwardly to a level above that attained by any ordinary accumulation of water in the tank. The screen part 16 of the filter will allow the escape of vapors which accumulate within the filter, thereby reducing the pressure at the intake. The filter element 30 can be regarded as a single foraminous structure of varying porosity from bottom to top.

Figure 6:
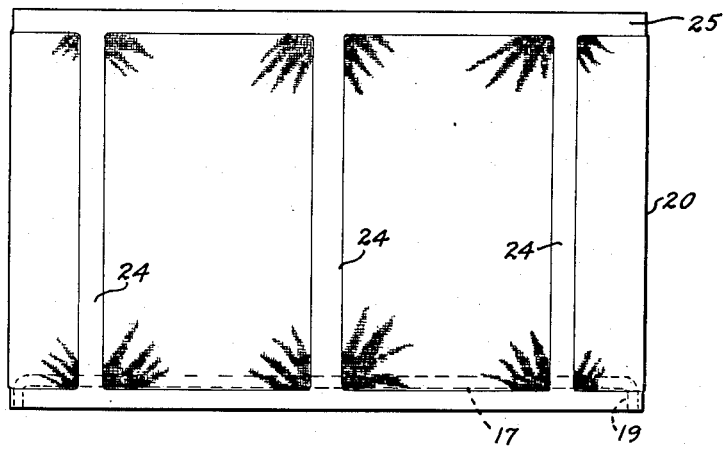
Fig. 6 is a side elevation of the filter 20 used in Figs. 1 and 3.

In Fig. 6 the filter element 20 is shown in detail and somewhat enlarged. It will be noted that the bottom is formed by a disk 17 with a peripheral downturned flange 19. The cylindrical walls of the filter element 20 are formed of two layers of "Saran" and are stiffened longitudinaly by ribs 24. These ribs can be conveniently formed by a process of hot-rolling because of the thermoplastic nature of the material. The cylindrical filter 20 is attached to the flange 19, and is also reinforced at its top edge 25 by a similar process.

Figure 7:
Fig. 7 is a section, on an enlarged scale, of the filter shown in cross-section in Fig. 5.

In Fig. 7 is shown the manner of joining the filter element 30 with the screen element 16 as used in the device in Fig. 5. In this instance, a double layer of "Saran" is cemented as illustrated at 33 to opposite sides of the screen element 16. It is entirely possible that a hot-rolling process can be used to attain the same result.

Figure 8:
Fig. 8 is a section, on an enlarged scale, of a modified form of filter for Fig. 5.

In Fig. 8 is shown a modified construction for the filter in Fig. 5. In this modification, the filter element 30 is attached by cement or the like 33 to one side of the screen 16, the difference between Fig. 7 and Fig. 8 being that the screen 16 is of a depth in Fig. 8 to extend the full distance between the casings 10 and 15.

Figure 9:
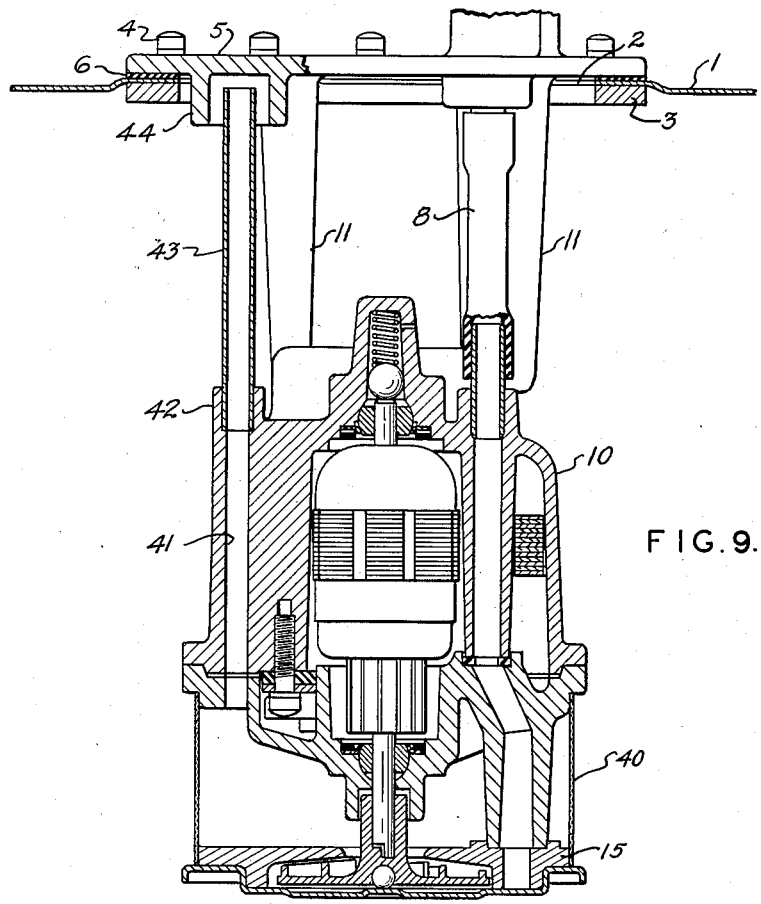
Fig. 9 is a view of an electric fuel pump, partly in section, equipped with a "Saran" filter instead of a screen, and having a separate vent.

In Fig. 9 is shown another form of the instant invention. The same reference characters have been used to indicate corresponding parts shown in Fig. 2. In this form, the fuel tank 1 has an access opening 2 reinforced by the ring 3. The access cover 5 is secured in place by a plurality of screws 4 engaging threads in the reinforcing ring 3. The gasket 6 seals the cover plate. Integral with the cover plate 5 are brackets 11 supporting the pump body 10 within the fuel tank. Spaced axially from the pump body is pump casing 15, which forms, together with the pump body, an intake opening for the pump. The elements of the structure so far described are identical with those shown in detail in the co-pending application above referred to.

In this form of the invention, the intake opening for the pump is surrounded by a "Saran" filter 40 which has a water-tight seal with the pump casing 50 and replaces the screen 16 shown in Fig. 2.

In order to avoid the disadvantages of this construction, as explained above, a separate vent passage is incorporated in the pump body 10. This vent passage 41 leads from the pump intake to the top of the casing 10. The opening 42 in the top of the pump body 10 receives a standpipe 43 which extends within a pocket 44 provided in the access cover plate. The upper end of the standpipe 43 is spaced from the top and side walls of the pocket 44 to form a vent passage similar to 22 in Fig. 2.

Certain structures have been described herein which will fulfill all the objects of the present invention, but it is contemplated that other modifications will be obvious to those skilled in the art which come within the scope of the invention as defined by the appended claims.

I claim:

1. In a fuel system, a fuel tank having a normal full fuel level, a centrifugal fuel pump having a fuel inlet for submerged operation in liquid fuel within said tank, filter means for freely passing liquid fuel and substantially preventing the passage of water and vapors and defining a filtered fuel reservoir communicating with said fuel inlet, and vent means for the passage of vapors from the filtered fuel in said reservoir to provide vapor-free liquid fuel for the pump, said filter comprising a vertically disposed side wall having an upper end above said fuel inlet and spaced from the top of the tank, and above said normal full fuel level in said tank.

2. In a fuel system, a fuel tank, a centrifugal fuel pump having a fuel inlet for submerged operation in liquid fuel within said tank, filter means for freely passing liquid fuel and substantially preventing the passage of water and vapors and defining a filtered fuel reservoir communicating with said fuel inlet, said filter means including a vertical side wall having an upper end, and vent means for the passage of vapors from the filtered fuel in said reservoir to provide vapor-free liquid fuel for the pump, said vent means comprising a porous screen secured to the upper end of said filter for the escape of fuel vapors from said reservoir.

3. In a fuel supply system, the combination comprising, a fuel tank, a maximum normal water level position in the bottom of said tank and a normal full fuel level position in the top of said tank, a fuel pump in said tank, said fuel pump having a fuel inlet adjacent a bottom portion of said tank, a filtered fuel reservoir communicating with said fuel inlet and providing said inlet with filtered fuel, said filtered fuel reservoir comprising vertically disposed filter means for freely passing liquid fuel and substantially preventing the passage of water, said filter means having a lower portion below and an upper portion above said maximum water level position in said tank, whereby the fuel in said filtered fuel reservoir is substantially devoid of water.

4. In a fuel supply system, the combination comprising, a fuel tank, a maximum normal water level position in the bottom of said tank and a normal full fuel level position in the top of said tank, a fuel pump in said tank, said fuel pump having a fuel inlet adjacent a bottom portion of said tank, a filtered fuel reservoir communicating with said fuel inlet and providing a supply of fuel for said fuel inlet, said filtered fuel reservoir comprising vertically disposed filter means for freely passing liquid fuel and substantially preventing the passage of water and vapor, said filter means having a lower portion below and an upper portion above said maximum normal water level position in said tank, and vent means for the removal of vapor from said fuel reservoir, whereby the fuel entering said fuel reservoir is substantially devoid of water and vapor pressure is prevented from building up at said fuel inlet.

5. In the fuel supply system of claim 4, said upper portion of said filter means being above the maximum full fuel level position in said tank, said vent means comprising an opening between said reservoir and said tank adjacent said upper portion of said filter means.

6. In the fuel supply system of claim 4, said upper portion of said filter means being below the maximum full fuel level position in said tank, said vent means comprising an open passage adjacent said upper portion of said filter means, and screen means between said opening and said fuel inlet for preventing solid foreign matter from passing through said opening and into said fuel inlet.

7. In the fuel supply system of claim 4, said fuel pump having a body, said lower portion of said filter means being in substantially sealed engagement with said body, said upper portion of said filter means being below said maximum full fuel level position in said tank, and said vent means comprising screen means for preventing solid foreign matter from entering said reservoir, opposite portions of said screen means being in substantially sealed engagement with, respectively, said upper portion of said filter means and said body.

8. In the fuel supply system of claim 4, said fuel pump having a body portion, said upper and lower portions of said filter means being in substantially sealed engagement with adjacent portions of said pump body and defining a substantially closed reservoir, said upper portion of said filter means being below the maximum full fuel position in said tank, said vent means comprising an opening in said body portion communicating with said reservoir at a first end and with said tank above the normal full fuel position in said tank at an opposite end.

References Cited in the file of this patent
UNITED STATES PATENTS

| | | |
|---|---|---|
| 1,394,011 | Hills | Oct. 18, 1921 |
| 1,399,943 | Dunham | Dec. 13, 1921 |
| 1,496,713 | Kuhn et al. | June 3, 1924 |
| 1,903,005 | McCuen | Mar. 28, 1933 |
| 1,910,553 | Lentz | May 23, 1933 |
| 2,288,532 | Knapp | June 30, 1942 |
| 2,295,982 | Widman | Sept. 15, 1942 |
| 2,306,297 | Curtis | Dec. 22, 1942 |
| 2,352,958 | Lauer et al. | July 4, 1944 |
| 2,369,440 | Curtis | Feb. 13, 1945 |
| 2,370,590 | Taylor | Feb. 27, 1945 |
| 2,392,128 | Dinsmore | Jan. 1, 1946 |
| 2,413,546 | Curtis et al. | Dec. 31, 1946 |
| 2,424,211 | Webb | July 15, 1947 |
| 2,780,999 | Compton et al. | Feb. 12, 1957 |
| 2,788,125 | Webb | Apr. 9, 1957 |

FOREIGN PATENTS

| | | |
|---|---|---|
| 461,581 | Great Britain | Feb. 19, 1937 |